Patented Sept. 26, 1933

1,928,269

UNITED STATES PATENT OFFICE 1,928,269

PROCESS OF PREPARING ESTERS OF THE CARBOHYDRATES

Albrecht Schmidt, Frankfort-on-the-Main, and Gerhard Balle and Hans Lange, Frankfort-on-the-Main-Hochst, Germany, assignors to I. G. Farbenindustrie Aktiengesellschaft, Frankfort-on-the-Main, Germany No Drawing. Application July 15, 1930, Serial No. 468,202, and in Germany July 19, 1929

3 Claims. (Cl. 260—101)

The present invention relates to a process of preparing esters of the carbohydrates.

We have found that esters of the carbohydrates can be made in a particularly easy and uniform manner by causing the reaction to take place in the presence of sulfur dioxide as a solvent or a diluent and applying a raised pressure. If the esters of the carbohydrates are prepared while applying a raised pressure or while further raising the pressure due to the use of sulfur dioxide at the temperatures in question there is obtained a considerably quicker and completely uniform esterification of the cellulose or the transformation product thereof, for instance hydrocellulose and other carbohydrates, such as starch; furthermore the after-treatment, for instance the hydrolysis which in some cases may be necessary is considerably shortened. For this purpose an inert gas, such as nitrogen, or compressed air may be used and thus the pressure due to the use of sulfur dioxide at the reaction temperature is multiplied. The pressure applied may be of any desired height, it is only limited by the strength of the apparatus used. While leaving the quantitative relations and the temperatures unaltered, the time of the reaction can be considerably decreased; in some cases it is only half the time otherwise required. The reaction can likewise take place in the presence of a limited quantity of an oxidizing agent, such as a metal oxide.

The esters thus obtained are completely equal as to their properties to the products obtainable without the use of an over-pressure.

The following examples illustrate the invention, but they are not intended to limit it thereto, the parts being by weight:

(1) 100 parts of cellulose in the form of cotton-linters are acetylated with 250–300 parts of acetic anhydride, 300–500 parts of liquid sulfur dioxide and 1–2 parts of sulfuric acid in a pressure vessel at a temperature of about 20° C.–25° C. under a total pressure of about 12 atmospheres produced by means of nitrogen until the reaction is complete; this occurs after about 2–3 hours. The hydrolysis is likewise carried out in known manner under a total pressure of 12 atmospheres produced by means of nitrogen. After 6–8 hours the cellulose acetate obtained is soluble in acetone. The reaction mixture is then forced into water contained in a vessel during which operation the cellulose acetate is precipitated and the sulfur dioxide is eliminated by distillation.

After the product has been worked up in the usual manner, about 150 parts of cellulose acetate are obtained.

(2) 100 parts of cellulose are thoroughly stirred for 5–6 hours together with 200–250 parts of acetic anhydride, 150 parts of propionic acid, 5–10 parts of sulfuric acid and 300–500 parts of sulfur dioxide in a pressure vessel at a temperature between 10° C. and 15° C. under a total pressure of 12 atmospheres produced by means of nitrogen. The reaction mixture is then introduced into water, during which operation the sulfur dioxide is continuously eliminated by distillation, while the cellulose ester is precipitated in colorless flakes. After the product has been worked up in the usual manner, 150–160 parts of cellulose acetopropionate soluble in acetone are obtained.

(3) 100 parts of starch are treated as described in Example 2 with 260 parts of acetic anhydride, 0,6 parts of sulfuric acid and 500–600 parts of sulfur dioxide; the whole is worked up as indicated above. A starch acetate soluble in chloroform is obtained. If the acetylation is followed by a hydrolysis, acetyl starch soluble in acetone is obtained.

Yield: about 150 parts of starch acetate.

We claim:

1. Process of preparing pure and mixed esters of the carbohydrates which comprises carrying out the esterification in liquid sulfur dioxide under a pressure exceeding that of the sulfur dioxide.

2. Process of preparing pure and mixed esters of the carbohydrates which comprises carrying out the esterification in liquid sulfur dioxide under a pressure exceeding that of the sulfur dioxide, by means of a compressed inert gas.

3. Process of preparing pure and mixed esters of cellulose which comprises carrying out the esterification in liquid sulfur dioxide under a pressure exceeding that of the sulfur dioxide by means of compressed nitrogen.

ALBRECHT SCHMIDT.
GERHARD BALLE.
HANS LANGE.